United States Patent
Dooley et al.

(10) Patent No.: US 10,343,467 B1
(45) Date of Patent: *Jul. 9, 2019

(54) TIRE INFLATION SYSTEM SAFETY VALVE

(71) Applicant: Airgo IP, LLC, Oklahoma City, OK (US)

(72) Inventors: Daniel P. Dooley, Oklahoma City, OK (US); Brian Feldt, Burnsville, MN (US); Eric Laveen, Burnsville, MN (US)

(73) Assignee: Airgo IP, LLC, Oklahoma City, OK (US)

( * ) Notice: Subject to any disclaimer, the term of this patent is extended or adjusted under 35 U.S.C. 154(b) by 40 days.

This patent is subject to a terminal disclaimer.

(21) Appl. No.: 15/346,283

(22) Filed: Nov. 8, 2016

(51) Int. Cl.
  *B60C 23/00* (2006.01)
  *B60C 29/06* (2006.01)

(52) U.S. Cl.
  CPC .......... *B60C 23/003* (2013.01); *B60C 29/068* (2013.01)

(58) Field of Classification Search
  CPC .............................. B60C 23/003; B60C 29/068
  See application file for complete search history.

(56) References Cited

U.S. PATENT DOCUMENTS

| | | |
|---|---|---|
| 1,072,907 A | 9/1913 | Brooks |
| 1,083,847 A | 1/1914 | McDowell et al. |
| 1,165,057 A | 12/1915 | Bayly |
| 1,205,504 A | 11/1916 | Bearce |
| 1,827,662 A | 10/1931 | Maas |
| 2,156,841 A | 5/1939 | Davis |
| 2,177,042 A | 10/1939 | Michael |
| 2,242,207 A | 5/1941 | Bowers |
| 2,657,731 A | 11/1953 | Gozzoli |
| 2,849,047 A | 8/1958 | Lamont et al. |
| 2,976,606 A | 3/1961 | Huet |
| 3,276,503 A | 10/1966 | Kilmarx |
| 3,367,722 A | 2/1968 | Miyanaga |
| 3,705,614 A | 12/1972 | Juttner et al. |
| 3,838,717 A | 10/1974 | Wolf |
| 4,154,279 A | 5/1979 | Tsuruta |
| 4,387,931 A | 6/1983 | Bland |
| 4,582,107 A | 4/1986 | Scully |
| 4,641,698 A | 2/1987 | Bitonti |
| 4,685,501 A | 8/1987 | Williams |
| 4,805,681 A | 2/1989 | Vollmer et al. |

(Continued)

*Primary Examiner* — Kip T Kotter
(74) *Attorney, Agent, or Firm* — Hall Estill Attorneys at Law

(57) ABSTRACT

A tire inflation system safety valve includes at least an air line disposed between a rotary union and a tire communicating with an axle supporting a hubcap, the rotary union axially aligned with the axle and mounted to the hubcap. The air line facilitating pressurized air transferred between the rotary union and the tire. The tire inflation system safety valve including at least a valve housing providing a valve activation chamber, a fluid conduit, supported by the valve housing, having a downstream end and an upstream end and in fluid communication with the valve activation chamber, and a diaphragm disposed within the valve activation chamber and communicating with the fluid conduit. The diaphragm, in response to the pressurized air of a predetermined pressure, automatically precludes air transfer between the upstream end of the fluid conduit and the downstream end of the fluid conduit.

18 Claims, 6 Drawing Sheets

(56) References Cited

U.S. PATENT DOCUMENTS

| | | | | |
|---|---|---|---|---|
| 4,844,138 | A | 7/1989 | Kokubu | |
| 4,883,105 | A * | 11/1989 | Schultz | B60C 23/003 137/859 |
| 4,883,106 | A | 11/1989 | Schultz et al. | |
| 4,893,664 | A * | 1/1990 | Oltean | B60C 23/003 137/859 |
| 4,924,926 | A | 5/1990 | Schultz et al. | |
| 5,080,156 | A | 1/1992 | Bartos | |
| 5,080,157 | A | 1/1992 | Oerter | |
| 5,174,839 | A | 12/1992 | Schultz et al. | |
| 5,236,028 | A | 8/1993 | Goodell et al. | |
| 5,287,906 | A | 2/1994 | Stech | |
| 5,377,736 | A | 1/1995 | Stech | |
| 5,398,743 | A | 3/1995 | Bartos | |
| 5,429,167 | A | 7/1995 | Jensen | |
| 5,482,358 | A | 1/1996 | Kuck | |
| 5,538,062 | A | 7/1996 | Stech | |
| 5,558,408 | A | 9/1996 | Naedler et al. | |
| 5,584,949 | A | 12/1996 | Ingram | |
| 5,735,364 | A | 4/1998 | Kinoshita | |
| 5,752,746 | A | 5/1998 | Perry | |
| 5,767,398 | A | 6/1998 | Naedler | |
| 5,769,979 | A | 6/1998 | Naedler | |
| 6,105,645 | A | 8/2000 | Ingram | |
| 6,145,559 | A | 11/2000 | Ingram, II | |
| 6,244,316 | B1 * | 6/2001 | Naedler | B60C 23/003 152/417 |
| 6,401,743 | B1 * | 6/2002 | Naedler | B60C 23/003 137/224 |
| 6,435,238 | B1 | 8/2002 | Hennig | |
| 6,585,019 | B1 | 7/2003 | Ingram | |
| 6,968,882 | B2 | 11/2005 | Ingram | |
| 7,302,980 | B2 | 12/2007 | Ingram | |
| 7,418,989 | B2 | 9/2008 | Ingram | |
| 2004/0103939 | A1 * | 6/2004 | Beau | B60C 23/003 137/225 |
| 2004/0187568 | A1 | 9/2004 | Locatelli | |
| 2005/0133134 | A1 | 6/2005 | Ingram et al. | |
| 2006/0179929 | A1 | 8/2006 | Becker | |
| 2012/0059546 | A1 * | 3/2012 | Wilson | B60C 23/003 701/34.4 |
| 2012/0218095 | A1 * | 8/2012 | Zhou | B60C 29/064 340/447 |

* cited by examiner

TIRE INFLATION SYSTEM SAFETY VALVE

FIELD OF THE INVENTION

The present invention relates to the field of tire pressure maintenance. More particularly, the present embodiments relate to the management of tire pressure of tires supporting tractor trailers by way of a safety valve, even while the trailers are traveling along a roadway.

BACKGROUND OF THE INVENTION

The present embodiments relate to a tire inflation system safety valve for use in a central tire pressure management system for automatically maintaining the inflation pressure of the pneumatic tires on moving vehicles such as tractor trailers. Typically, tractor trailers utilize the air compressor on the tractor as a source of pressurized air to activate braking systems. The compressor directs air to the reserve air brake tank on the trailer, which generally corresponds to the range of typical inflation pressures in the tires used on trailers. Air from the reserve air brake tank is first directed to the braking system to maintain the air pressure in the braking system. In conventional tire inflation systems, excess air is directed from the tank through a pressure protection valve to a control box for the tire inflation system. The pressure protection valve only opens to direct the air to the control box when excess air pressure is present, thereby preventing air from being directed to the tire inflation system which is needed for the trailer braking system.

The control box contains a pressure regulator which is set to the cold tire pressure of the particular tires on the trailer so as to supply air to the tires at the desired pressure level in the event of a leak. Air is directed from the control box to the leaking tire, which either carries an air line from the control box, or provides pressurized air to sealed axle, which functions as an air conduit. The pressurized air carried by the axles communicates with each pair of trailer tires mounted thereon through a rotary union assembly by which air flow is directed from a stationary air line to the valve stems on the rotating tires. Pressure responsive valves, (also referred to herein as tire inflation system safety valve) are employed between each rotary union assembly and its associated tires so that upon the occurrence of a leak in one of the tires, the resulting pressure loss will cause one of the valves to open and allow air flow from the rotary union assembly to pass therethrough to the leaking tire, if the system cannot accommodate the demand for air, and the air pressure in the system drops to a predetermined level safety valves, akin to those of the present embodiments and associated with each tire in the system, will close to preclude air in the remaining tires from reaching an un-inflated state.

As tire inflation systems become adopted for broader uses, reliability and ease of maintenance, as well as an ability to manage under inflated as well as over inflated tires have emerged as important demands from the industry, accordingly improvements in apparatus and methods of installing tire inflation systems are needed and it is to these needs the present invention is directed.

SUMMARY OF THE INVENTION

In accordance with preferred embodiments, a tire inflation system safety valve includes at least an air line disposed between a rotary union and a tire communicating with an axle supporting a hubcap, the rotary union axially aligned with the axle and mounted to the hubcap. The air line facilitating pressurized air transferred between the rotary union and the tire. The tire inflation system safety valve including at least a valve housing providing a valve activation chamber, a fluid conduit, supported by the valve housing, having a downstream end and an upstream end and in fluid communication with the valve activation chamber, and a diaphragm disposed within the valve activation chamber and communicating with the fluid conduit. The diaphragm, in response to the pressurized air of a predetermined pressure, automatically precludes air transfer between the upstream end of the fluid conduit and the downstream end of the fluid conduit. Further, in response to pressurized air in the air line being above a predetermined pressure, the diaphragm of the tire inflation safety valve automatically facilitates air transfer between the upstream end of the fluid conduit and the downstream end of the fluid conduit when said pressurized air in the air line is above said predetermined value.

These and various other features and advantages that characterize the claimed invention will be apparent upon reading the following detailed description and upon review of the associated drawings.

BRIEF DESCRIPTION OF THE DRAWINGS

The present invention is illustrated by way of example and not limitation in the figures of the accompanying drawings, in which like references indicate similar elements and in which.

DESCRIPTION OF PREFERRED EMBODIMENTS

Figure 1:
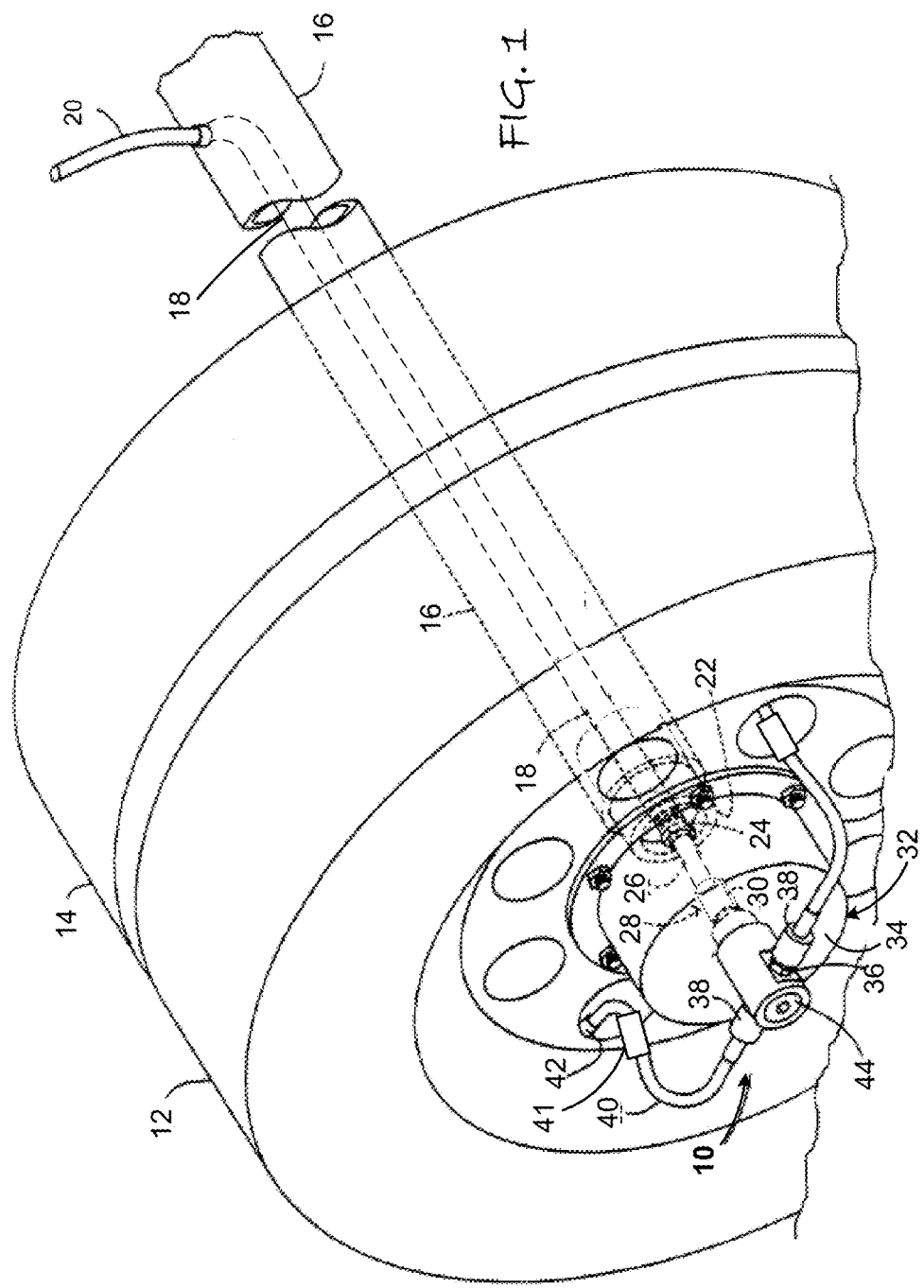
FIG. 1 is a partial perspective view of a rotary union assembly of the present novel tire pressure management system shown secured to an outer wheel of a pair of tractor trailer tires mounted on a stationary axle, and the tire inflation system safety valve.

It will be readily understood that elements of the present invention, as generally described and illustrated in the Figures herein, could be arranged and designed in a wide variety of different configurations. Referring now in detail to the drawings of the preferred embodiments, and turning to FIG. 1, the rotary union assembly 10 (also referred to herein as assembly 10, and rotary union 10) of the first preferred embodiment, while useable on a wide variety of movable vehicles employing stationary axles for automatically maintaining the inflation pressure of the pneumatic tires thereon, is particularly adapted for use on tractor trailers. Accordingly, the assembly 10 of the first preferred embodiment will be described in conjunction with a pair of adjacent vehicle tires 12 and 14 mounted on a stationary tractor trailer axle 16 (also referred to herein as trailer axle 16, and axle 16). While identical rotary union assemblies 10 are provided at the end of each axle on the trailer to maintain the inflation pressure of the tires carried thereby, in each: the preferred embodiment; the alternate preferred embodiment; and the alternative preferred embodiment, reference will be made to only one such assembly and the pair of tires it services.

Preferably, the trailer axle 16 which carries tires 12 and 14 is sealed and functions as a source for pressurized fluid, else houses an air supply line 18 to supply air to the rotary union assembly 10. A fluid supply line 20 preferably provides air under pressure to the interior of the axle 16, else to an air supply line 18, from the conventional air compressor on the tractor via a standard pressure protection valve and control box (not shown) to pressurize the axle 16, else to pressurize the air supply line 18, at the cold tire pressure of the trailer tires. FIG. 1 further shows that the axle 16 supports an axle plug 22, which in turn supports a push to connect fluid fitting 24. Preferably, the push to connect fluid fitting 24 is attached to and in fluid communication with a fill tube 26, which in a preferred embodiment is a flexible fill tube 26. Preferably, the flexible fill tube 26 is connected to a fluid conduit 28, which supplies pressurized air to the rotary union assembly 10. Preferably, the flexible fill tube 26 is secured to the fluid conduit 28, by a compression fitting 30. As those skilled in the art would know, a compression fitting, or alternate mechanical means, could serve the function of the push to connect fluid fitting 24.

In a preferred embodiment, the rotary union assembly 10 is mounted to a hubcap 32, from an exterior 34 of the hubcap 32, and provides pressurized air, by way of an air delivery channel 36, to tire pressure hose fittings 38 that are secured to tire pressure hoses 40. Each tire pressure hose 40 supplies the pressurized air to tire valve stems 42 of tires 12 and 14 through the tire inflation system safety valve 41. Preferably, the rotary union assembly 10 provides a removable seal access cover 44, which mitigates escapement of pressurized fluid from the air delivery channel 36, the tire pressure hoses 40, and the tires 12 and 14.

Figure 2:
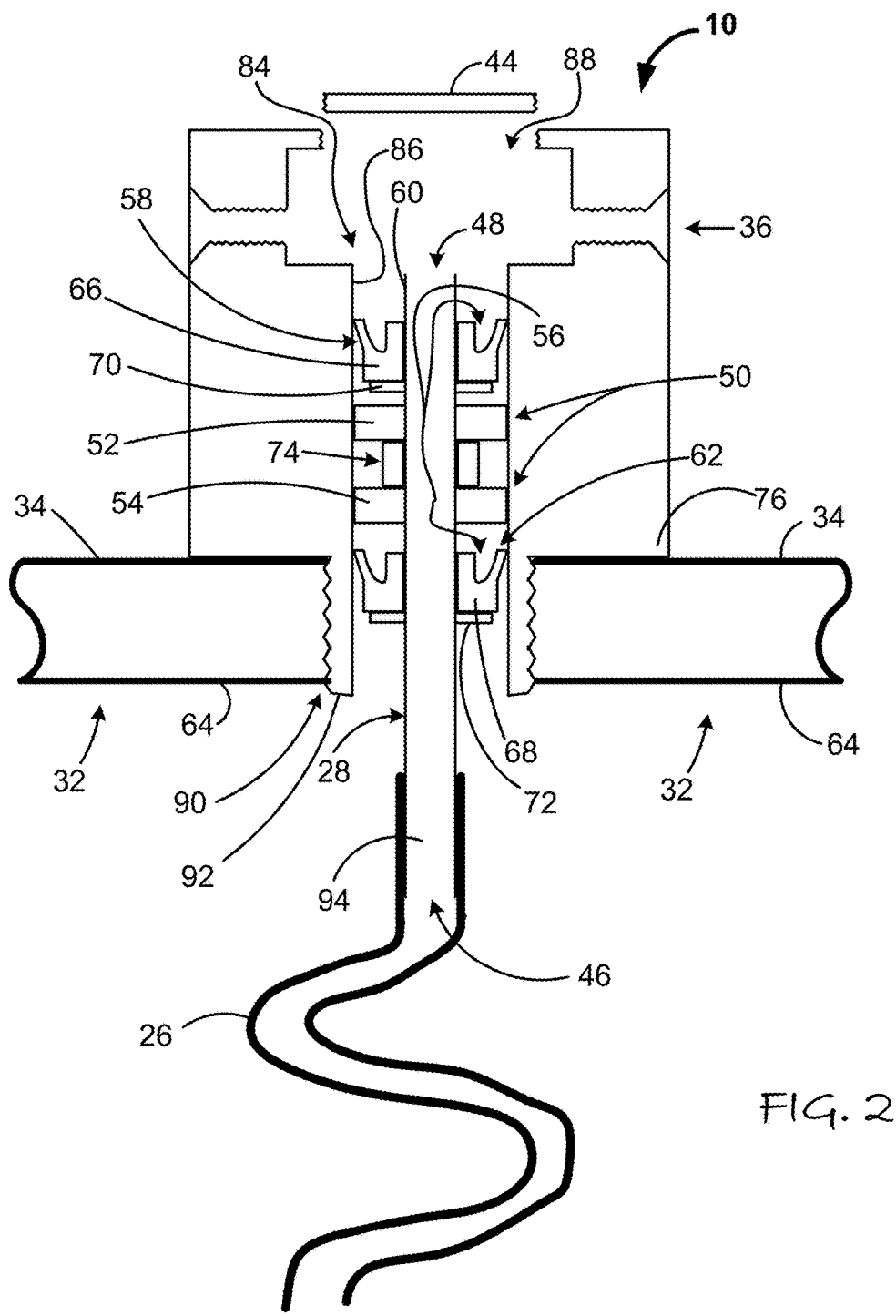
FIG. 2 is a cross-sectional side view of an embodiment of a rotary union assembly of the present novel the tire inflation system safety valve and its associated bearings and bearing spacer.

FIG. 2 shows a preferred embodiment that the rotary union 10 preferably includes at least a rotary union housing 76, supporting and confining the fluid conduit 28, within a central bore 84 (also referred to herein as channel 84), of the rotary union housing 76. The fluid conduit 28 preferably provides the downstream end 48 and the upstream end 46. Further shown by FIG. 2 is a pair of bearings 50; each of the pair of bearings 50 provides an inner race and an outer race. Each inner race of the pair of bearings 50, is in contact communication with an external surface 60, of the fluid conduit 28, and each outer race of the pair of bearings 50, is in pressing communication with a bore surface 86 (also referred to herein as wall 86), of the central bore 84, of the rotary union housing 76. The first bearing 52, of the pair of bearings 50, is adjacent the downstream end 48, of the fluid conduit 28, and the second bearing 54, of the pair of bearings 50, is adjacent the upstream end 46, of the fluid conduit 28.

FIG. 2 further shows that in a preferred embodiment, the rotary union 10 preferably includes a pair of fluid seals 56, the first fluid seal 58, of the pair of fluid seals 56, engages the external surface 60, of the fluid conduit 28, and is disposed between the first bearing 52, and the downstream end 48, of said fluid conduit 28. The second fluid seal 62, of the pair of fluid seals 56, engages the external surface 60 of the fluid conduit 28, and is disposed between said second bearing 54, and the upstream end 46, of the fluid conduit 28. In a preferred embodiment, the first fluid seal 58 provides the base portion 66, and the first fluid seal restraint 70, which is in pressing contact with the external surface 60 of the fluid conduit 28, abuts against the base portion 66, of the first fluid seal 58, to maintain the relative position of the first fluid seal 58, adjacent the bore surface 86, of the central bore 84; and the second fluid seal 62, provides the base portion 68, and the second fluid seal restraint 72, which is in pressing contact with the external surface 60 of the fluid conduit 28, abuts against the base portion 68, of the second fluid seal 62, to maintain the relative position of the second fluid seal 62, adjacent the bore surface 86, of the central bore 84. In a preferred embodiment, the rotary union housing 76 further provides a fluid distribution chamber 88 (also referred to herein as a fluid chamber 88), which is in fluid communication with the downstream end 48, of the fluid conduit 28. The fluid chamber 88, receives pressurized air from the fluid conduit 28, and transfers the received pressurized air to the tires 12 and 14 (of FIG. 1).

FIG. 2 still further shows that in a preferred embodiment, the hubcap 32 provides an attachment aperture 90. The attachment aperture 90 is preferably disposed between the interior 64 and the exterior 34, of the hubcap 32. The attachment aperture 90 provides an axis of rotation, which is preferably substantially aligned with an axis of the axle 16 (of FIG. 1). Additionally, the rotary union housing 76 provides at least an attachment member 92, which preferably is in mating communication with the attachment aperture 90. FIG. 2 further shows that the fluid conduit 28 provides a fluid communication portion 94, which extends beyond the attachment member 92, and into the interior of said hubcap 32.

Figure 3:
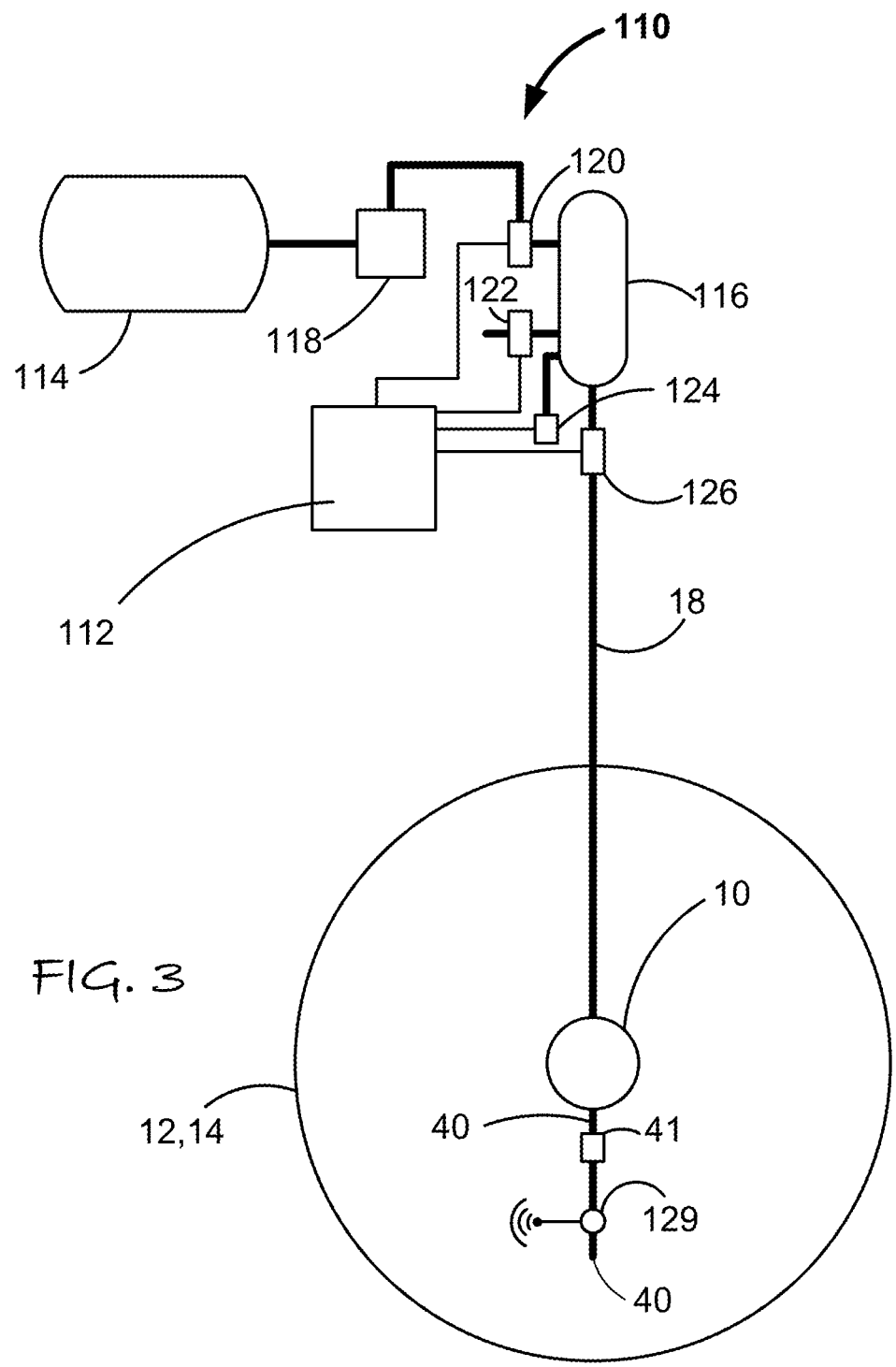
FIG. 3 is a block diagram of the present novel tire pressure management system of FIG. 1.

FIG. 3 shows a tire pressure management system 110, which preferably includes at least a fluid pressure controller 112, which in a preferred embodiment controls the flow of pressurized air into and out of the tires 12 and 14. The source of the pressurized air is a trailer air tank 114. The trailer air tank 114, is in fluidic communication with a tire pressure tank 116. The pressurized air from the trailer air tank 114 passes through an air regulator 118, and then through an air inlet control valve 120, operating under the control of the fluid pressure controller 112. In a preferred embodiment, the tire pressure management system 110, further includes at least: an air outlet valve 122, in fluid communication with the tire pressure tank 116, and under the control of the fluid pressure controller 112; a tire pressure tank pressure gauge 124, in fluid communication with the tire pressure tank 116, and in electronic communication with the fluid pressure controller 112; and an air pressure supply valve 126, in fluid communication with the tire pressure tank 116, and under the control of the fluid pressure controller 112. Preferably, the air pressure supply valve 126, supplies pressurized air to, or conversely, receives pressurized air from the air supply line 18, depending on whether the pressure in the tire (12,14), is above or below a desired pressure level.

In a preferred embodiment, pressurized air that flows into or out of the rotary union 10, is modulated by a tire inflation system safety valve 41. Preferably, tire inflation system safety valve 41, responds to air pressure supplied by the air supply line 18, by opening a spring loaded valve member, which allows pressurized air to flow out of the tire (12,14), when the pressure in the tire (12,14), is greater than the air pressure in the air supply line 18. Conversely, the tire inflation system safety valve 41, promotes the flow of pressurized air into the tire (12,14), when the pressure level within the tire 12,14 is less than the air pressure in the air supply line 18.

FIG. 3 further shows that the tire pressure management system 110, further preferably includes a tire pressure monitoring sensor 129, disposed between the tire inflation system safety valve 41, and the tire (12,14). In a preferred embodiment, the tire pressure monitoring sensor 129, measures the level of pressure within the tire (12,14), and relays the measured pressure level to the fluid pressure controller 112. The fluid pressure controller 112, compares the measured pressure level within the tire (12,14) to a target pressure, maintains the pressure available in the tire pressure tank 116 at the target level, and directs the air pressure supply valve 126, to release pressurized air to the tire inflation system safety valve 41, which activates to promote either inflation, or deflation of the tire (12,14), to bring the pressure level within the tire (12,14) into balance with the target pressure level. Once the desired pressure level within the tire (12,14) is achieved, as measured by the tire pressure monitoring sensor, the fluid pressure controller 112, directs the air pressure supply valve 126, to disengage.

In a preferred embodiment, the fluid pressure controller 112, operates both the air outlet valve 122, and the air inlet control valve 120, to maintain the pressure within the tire pressure tank 116, at a predetermined pressure level. For example, but not by way of limitation, if the tire pressure of the tires (12,14) is above the target pressure level, the fluid pressure controller 112, will crack open the air outlet valve 122, to allow relief of pressure from the system; and if the tire pressure of the tires (12,14) is below the target pressure level, the fluid pressure controller 112, will crack open the air inlet control valve 120, to allow pressure to build in the system.

Figure 4:
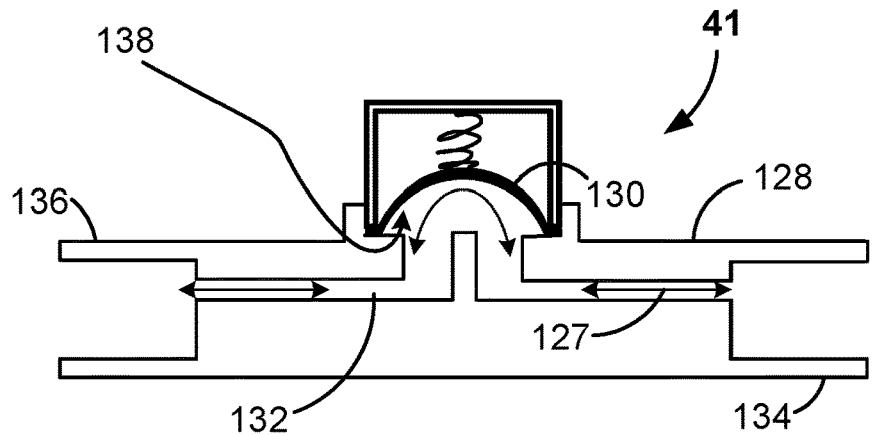
FIG. 4 is a cross-sectional side view of an embodiment of a tire inflation system safety valve of FIG. 1, shown in an open valve operating mode.

FIG. 4 shows an embodiment of the tire pressure management safety valve 41, which, in this embodiment, includes at least a valve housing 128, providing a valve activation chamber 130, a fluid conduit 132, configured for the transport of pressurized air 127. The fluid conduit 132, having a downstream end 134, and an upstream end 136. The fluid conduit 132, is provided and supported by the valve housing 128, and in fluid communication with the valve activation chamber 130. The present embodiment of the embodiment of the tire pressure management safety valve 41, preferably includes a diaphragm 138, disposed within the valve activation chamber 130, and communicating with the fluid conduit 132. The diaphragm 138, is responsive to the pressurized air 127, within the air line 40, such that when the pressurized air 127, in the air line 40 from the tire 12, 14 is above a predetermined value, the diaphragm 138, automatically facilitates air transfer between the downstream end outlet 142 (of FIG. 5), of the fluid conduit 132, and the upstream end inlet 140 (of FIG. 5), of the fluid conduit 132.

Preferably, the diaphragm 138, is formed from a flexible material, such as, but not limited to, a silicon rubber, polyurethane, latex, and butyl rubber. Further, the diaphragm 138, may be constructed having a flexible material core with a Polytetrafluoroethylene (PTFE) film applied to either side, or both sides of the flexible material core.

Figure 5:
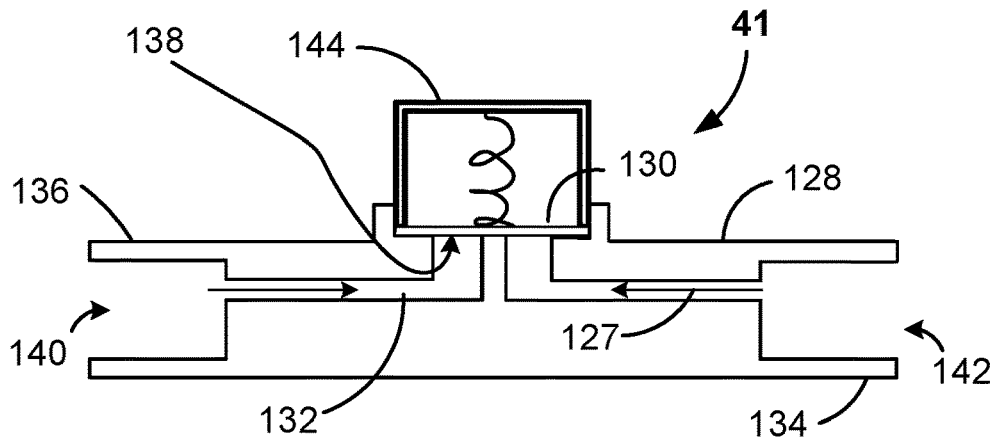
FIG. 5 is a cross-sectional side view of the embodiment of a tire inflation system safety valve of FIG. 1, shown in a closed valve operating mode.
Figure 6:
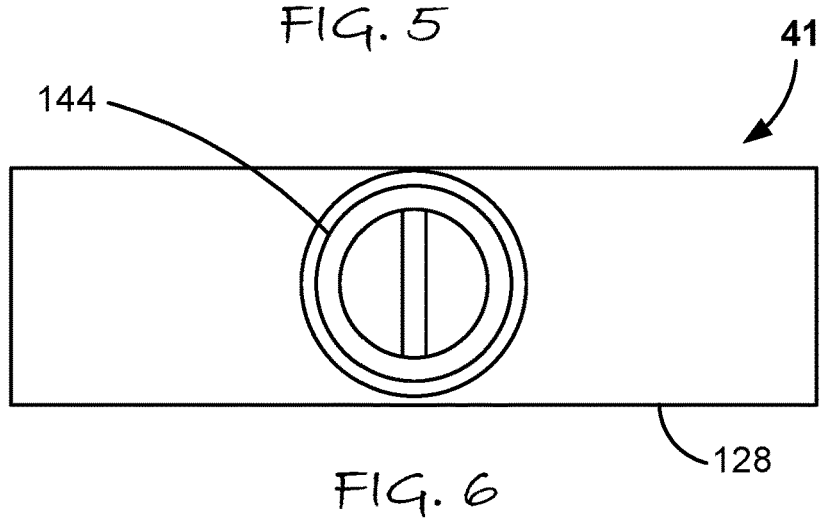
FIG. 6 is a top plan view of the embodiment of the tire inflation system safety valve of FIG. 5.

FIG. 5 shows the diaphragm further automatically precludes air transfer between the upstream end 140, of the fluid conduit 132, and the downstream end 142, of the fluid conduit 132, when the pressurized air 127, in the air line 40, is below the predetermined value. FIG. 5 further shows a valve activation chamber cap 144, enclosing the valve activation chamber 130. While FIG. 6 shows a top view of the valve activation chamber cap 144.

Figure 7:
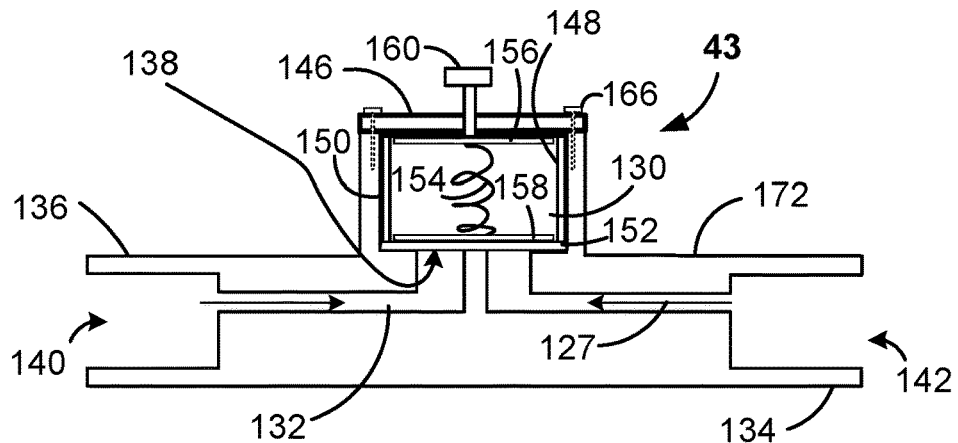
FIG. 7 is a cross-sectional top plan view of an alternate embodiment of a tire inflation system safety valve of FIG. 1, shown in a closed valve operating mode.

FIG. 7 depicts an alternate valve housing 172, of the tire pressure management safety valve 41. The alternate valve housing 172 provides the upstream air line connection port 140, which is enclosed by the alternate valve housing 172, and in fluid communication with the upstream end 136, of the fluid conduit 132, as well as the downstream air line connection port 142, which is enclosed by the alternate valve housing 172, and in fluid communication with the downstream end 134, of the fluid conduit 132. The alternate valve housing 172, further provides the valve activation chamber 130, which interacts with an alternate valve activation chamber cap 146.

FIG. 7 further depicts a diaphragm compression sleeve 148, in sliding communication with a wall 150, of the valve activation chamber 130. In a preferred embodiment, the diaphragm compression sleeve 148 is disposed between a periphery 152, of the diaphragm 138, and the valve activation chamber cap 146. Preferably, the diaphragm compression sleeve 148, applies a compressive load on the periphery 152, of the diaphragm 138, when the valve activation chamber cap 146, is in mating contact with and fully secured to the valve housing 172.

As may be seen by FIG. 7, the tire pressure management safety valve 41, further preferably includes a compressive load member 154, communicating with and disposed between the diaphragm 138, and the valve activation chamber cap 146. In a preferred embodiment, the compressive load member 154, applies a predetermined compressive load on the diaphragm 138, when the valve activation chamber cap 146, is in mating contact with, and fully secured to, the valve housing 172.

As further shown by FIG. 7, the tire pressure management safety valve 43, further preferably includes a push plate 156, disposed between the compressive load member 154, and the valve activation chamber cap 146. Still further, the tire pressure management safety valve 43, shown by FIG. 7, preferably includes a second push plate 158, disposed between the compressive load member 154, and the diaphragm 138, as well as an adjustment member 160, supported by the valve activation chamber cap 146, and acting on the push plate 156. Preferably, the adjustment member 160, is supported laterally by an adjustment aperture 168, shown in FIG. 9. The adjustment aperture 168 facilitating a vertical displacement of the adjustment member 160, relative to the push plate 156, thereby altering a compressive load imparted on the second push plate 158, by the compressive load member 154.

Figure 8:
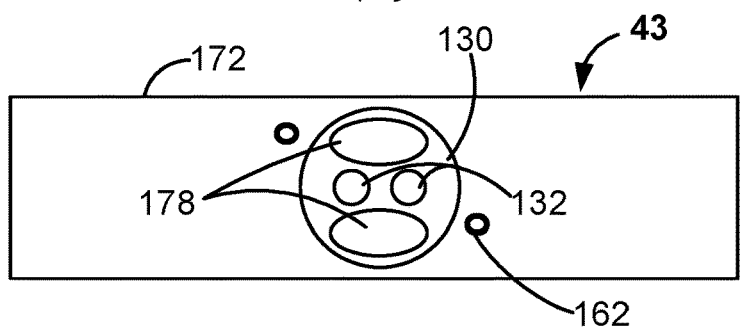
FIG. 8 is a top plan cross-sectional view of the alternate embodiment of the tire inflation system safety valve of FIG. 7.
Figure 9:
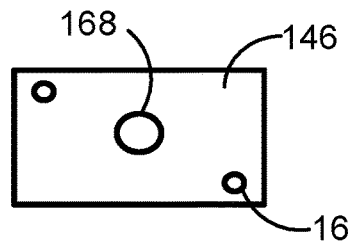
FIG. 9 is a top plan view of a valve activation chamber cap of the alternate embodiment of the tire inflation system safety valve of FIG. 8.

FIG. 8 shows that the valve housing 172 provides a securement aperture 162, the securement aperture 162, which is preferably in contact adjacency with the valve activation chamber cap 146, when the valve activation chamber cap 146, is in mating contact with and fully secured to the valve housing 172. FIG. 8 further presents a back pressure chamber 178, position in a base portion of the valve activation chamber 130. The back pressure chamber 178, improves the sealing, and unsealing, of the fluid conduit 132, by the diaphragm 138. While FIG. 9 shows the preferred valve activation chamber cap 146, provides an attachment aperture 164. The attachment aperture 164, is preferably in axial alignment with, and in pressing contact with, the securement aperture 162, when the valve activation chamber cap 146, is in mating contact with and fully secured to the valve housing 172.

Referring back to FIG. 7, the tire pressure management safety valve 43, further preferably includes a securement member 166. The securement member 166, interacts with the securement aperture 162, and the attachment aperture, 164. The securement member 166 preferably imparts a compressive load on the valve activation cap 146, when the valve activation chamber cap 146 is in mating contact with and fully secured to the valve housing 172.

Figure 10:
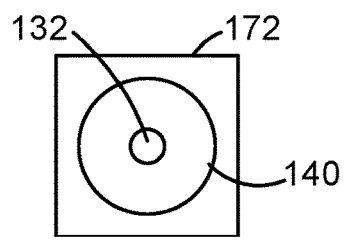
FIG. 10 is a cross-sectional end view of the valve activation chamber cap of the alternate embodiment of the tire inflation system safety valve of FIG. 8.

FIG. 10 depicts the relationship between the upstream air line connection port 140, provided by the valve housing 172, and the the fluid conduit 132, also provided by the valve housing 172, of the tire pressure management safety valve 41.

Figure 11:
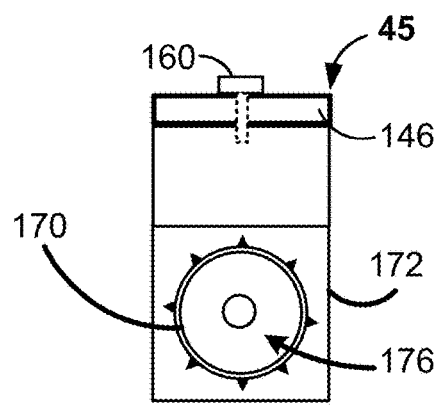
FIG. 11 is a partial cross-sectional end view of an alternative alternate embodiment of the tire inflation system safety valve.
Figure 12:
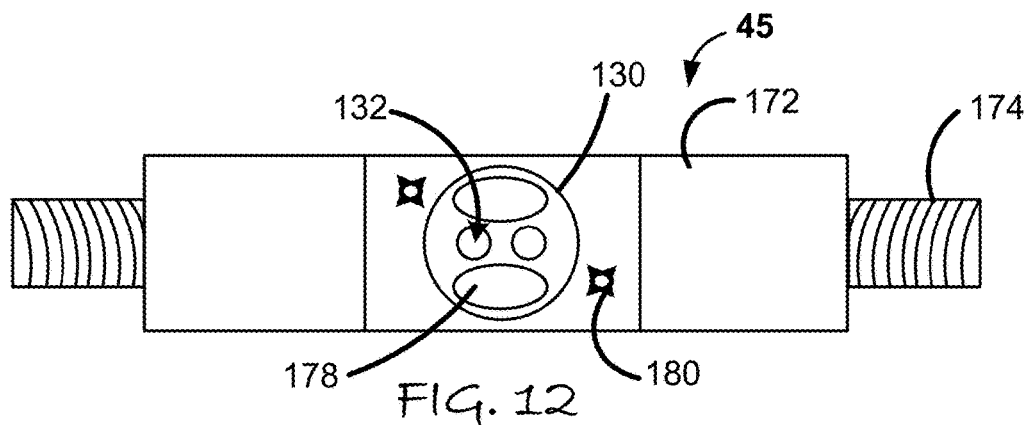
FIG. 12 is a partial cross-sectional top plan view of the alternative alternate embodiment of the tire inflation system safety valve of FIG. 11.

Turning to FIG. 11, shown therein is an alternative embodiment of the tire pressure management safety valve 45. Preferably, the alternative tire pressure management safety valve 45, further preferably includes a threaded insert 170, supported by the valve housing 172. Preferably, the threaded insert 170, is captured by, and in axial alignment with, the downstream air line connection port 142, such that the downstream air line connection port 142, inhibits rotation of the threaded insert 170. Preferably, the threaded insert presents a male thread portion 174, as shown by FIG. 12, and an orifice 176, which is in fluid communication with each the airline 40 (of FIG. 1), and the fluid conduit 132, of FIG. 7. As those skilled in the art will appreciate, the threaded insert 170 need not present a male thread portion 174, but could present a female threaded portion, or alternate connection coupling suitable for handling pressurized air, such as a quick disconnect, or push on connection.

FIG. 12 further shows that in the alternative embodiment of the tire pressure management safety valve 45, a second threaded insert 180, is provided by the valve housing 172. Preferably, the second threaded insert 180, is supported by the valve housing 172. Preferably, the second threaded insert 180, is captured by, and in axial alignment with, the securement aperture 162, of FIG. 8, such that the securement aperture 162, inhibits rotation of the second threaded insert 180, and in a preferred embodiment, the second threaded insert 180 presents female threads.

Figure 13:
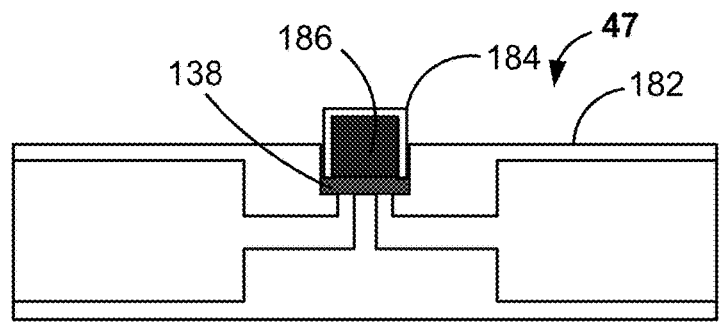
FIG. 13 shows an alternate alternative embodiment of the tire inflation system safety valve.

FIG. 13 shows an alternate, alternative preferred embodiment, a valve housing 182 of a tire pressure management safety valve 47, which accommodates a snap on valve activation chamber cap 184, which houses a compressive load member 186, which is preferably formed from a deformable polymer, that is a polymer having an ability to increase a force delivered by polymer in response to a load applied to the polymer, and return to its original shape when the applied force is removed. A compressive load member, such as 186, serves to improve the functional repeatability of the compressive load member 186, and serves to eliminate the push plates 156, 158.

In preferred embodiments the valve housing (128, 172, and 182), is formed from a rigid material, including, but not limited to metals, polymers, composites, and combinations thereof.

As will be apparent to those skilled in the art, a number of modifications could be made to the preferred embodiments which would not depart from the spirit or the scope of the present invention. While the presently preferred embodiments have been described for purposes of this disclosure, numerous changes and modifications will be apparent to those skilled in the art. Insofar as these changes and modifications are within the purview of the appended claims, they are to be considered as part of the illustrative embodiments of the present invention.

What is claimed is:

1. A tire pressure management system comprising:
   an air line in communication with and disposed between a rotary union and a tire communicating with an axle, the rotary union axially aligned with the axle and mounted to a hubcap associated with the axle and the tire, the rotary union mounted to the hubcap on an exterior portion of the hubcap, the air line facilitating pressurized air transferred between the rotary union and the tire; and
   a tire pressure management safety valve disposed between the rotary union and the tire, and further disposed within the air line, the tire pressure management safety valve including at least:
   a valve housing providing a valve activation chamber;
   a fluid conduit, the fluid conduit having a downstream end and an upstream end, the fluid conduit supported by the valve housing and in fluid communication with the valve activation chamber;
   a diaphragm disposed within the valve activation chamber and communicating with the fluid conduit, the diaphragm responsive to said pressurized air within the air line, such that when said pressurized air in the air line is below a predetermined value, the diaphragm automatically precludes air transfer between the upstream end of the fluid conduit and the downstream end of the fluid conduit;
   a valve activation chamber cap closing a top portion of the valve activation chamber; and
   a diaphragm compression sleeve in sliding communication with a wall of the valve activation chamber and disposed between a periphery of the diaphragm and the valve activation chamber cap, the diaphragm compression sleeve applying a compressive load on the periphery of the diaphragm when the valve activation chamber cap is in mating contact with and fully secured to the valve housing.

2. The tire pressure management system of claim 1, in which the diaphragm further automatically facilitates air transfer between the upstream end of the fluid conduit and the downstream end of the fluid conduit when said pressurized air in the air line is above said predetermined value.

3. The tire pressure management system of claim 2, further comprising an upstream air line connection port enclosed by the valve housing and in fluid communication with the upstream end of the fluid conduit.

4. The tire pressure management system of claim 3, further comprising a downstream air line connection port enclosed by the valve housing and in fluid communication with the downstream end of the fluid conduit.

5. The tire pressure management system of claim 4, further comprising a compressive load member communicating with and disposed between the diaphragm and the valve activation chamber cap, the compressive load member applying a predetermined load on the diaphragm when the valve activation chamber cap is in mating contact with and fully secured to the valve housing.

6. The tire pressure management system of claim 5, further comprising a push plate disposed between the compressive load member and the valve activation chamber cap.

7. The tire pressure management system of claim 6, further comprising a second push plate disposed between the compressive load member and the diaphragm.

8. The tire pressure management system of claim 7, further comprising an adjustment member supported by the valve activation chamber cap and acting on the push plate.

9. The tire pressure management system of claim 8, in which the valve housing provides a securement aperture, the securement aperture in contact adjacency with the valve activation chamber cap when the valve activation chamber cap is in mating contact with and fully secured to the valve housing.

10. The tire pressure management system of claim 9, in which said valve activation chamber cap provides an attachment aperture, said attachment aperture in axial alignment with, and in pressing contact with, the securement aperture when the valve activation chamber cap is in mating contact with and fully secured to the valve housing.

11. The tire pressure management system of claim 10, further comprising a securement member, the securement member interacting with the securement aperture and the attachment aperture, the securement member imparting a compressive load on the valve activation cap when the valve activation chamber cap is in mating contact with and fully secured to the valve housing.

12. The tire pressure management system of claim 11, in which the valve activation chamber cap further comprising an adjustment aperture, the adjustment aperture adjacent to, and in axial alignment with, the push plate.

13. The tire pressure management system of claim 12, further comprising the adjustment member supported laterally by the adjustment aperture, the adjustment aperture facilitating a vertical displacement of the adjustment member relative to the push plate, thereby altering a compressive load imparted on the second push plate by the compressive load member.

14. The tire pressure management system of claim 13, further comprising a threaded insert, the threaded insert supported by the valve housing, the threaded insert captured by, and in axial alignment with, the downstream air line connection port such that the downstream air line connection port inhibits rotation of the threaded insert.

15. The tire pressure management system of claim 14, in which the threaded insert presents a male thread and provides an orifice, said orifice in fluid communication with each the airline and the air conduit.

16. The tire pressure management system of claim 15, further comprising a second threaded insert, the second threaded insert supported by the valve housing, the second threaded insert captured by, and in axial alignment with, the securement aperture such that the securement aperture inhibits rotation of the second threaded insert.

17. The tire pressure management system of claim 16, in which the valve housing is formed from a rigid material.

18. The tire pressure management system of claim 17, in which the valve housing rigid material is selected from a group consisting of metals and polymers.

* * * * *